United States Patent
Kujawa

(10) Patent No.: US 7,874,832 B2
(45) Date of Patent: Jan. 25, 2011

(54) ASSEMBLY FOR PRODUCING AN AUTO HEADLINER WITH A FOLDED-OVER PERIMETER EDGE

(75) Inventor: Ray Kujawa, Allenton, MI (US)

(73) Assignee: Kimastle Corporation, Chesterfield, MI (US)

( * ) Notice: Subject to any disclaimer, the term of this patent is extended or adjusted under 35 U.S.C. 154(b) by 417 days.

(21) Appl. No.: 12/138,801

(22) Filed: Jun. 13, 2008

(65) Prior Publication Data

US 2009/0309392 A1    Dec. 17, 2009

(51) Int. Cl.
*B29C 63/04* (2006.01)

(52) U.S. Cl. .................. 425/394; 72/380; 156/216; 156/479; 493/405

(58) Field of Classification Search .......... 425/330, 425/383, 393–394; 72/380, 385, 388; 156/202, 156/204, 212, 216, 217, 223, 226, 227; 493/67, 493/70, 79–80, 399, 405, 408, 412, 417–419
See application file for complete search history.

(56) References Cited

U.S. PATENT DOCUMENTS

| | | | |
|---|---|---|---|
| 3,580,770 A * | 5/1971 | Dyal | 156/216 |
| 4,692,108 A | 9/1987 | Cesano et al. | |
| 5,962,089 A | 10/1999 | Jones et al. | |
| 6,161,895 A | 12/2000 | Jaeckle et al. | |
| 7,108,311 B2 | 9/2006 | Dooley et al. | |
| 7,146,732 B2 | 12/2006 | Bohm et al. | |
| 7,217,387 B2 | 5/2007 | Evans et al. | |
| 2001/0008668 A1 | 7/2001 | Jones et al. | |

\* cited by examiner

*Primary Examiner*—Richard Crispino
*Assistant Examiner*—Thu Khanh T Nguyen
(74) *Attorney, Agent, or Firm*—Gifford, Krass, Sprinkle, Anderson & Citkowski, P.C.

(57) ABSTRACT

An assembly for creating a folded edge for a flexible headliner material. A table defines an outer configured perimeter upon which is supported the headliner with or without a supporting template. Pairs of primary and secondary fingers are arranged at perimeter spaced locations in mounted fashion over the outer configured perimeter. The fingers contact outwardly displaceable fashion relative to the headliner inner perimeter, and such that the fingers are cooperatively displaced in a first step imparting a bent edge to the headliner. A projecting edge of the secondary finger is subsequently displaced over a terminating edge of the first finger in order to fold over the bent edge, or against the template, to form the edge profile to the headliner in a non-pleated fashion.

20 Claims, 5 Drawing Sheets

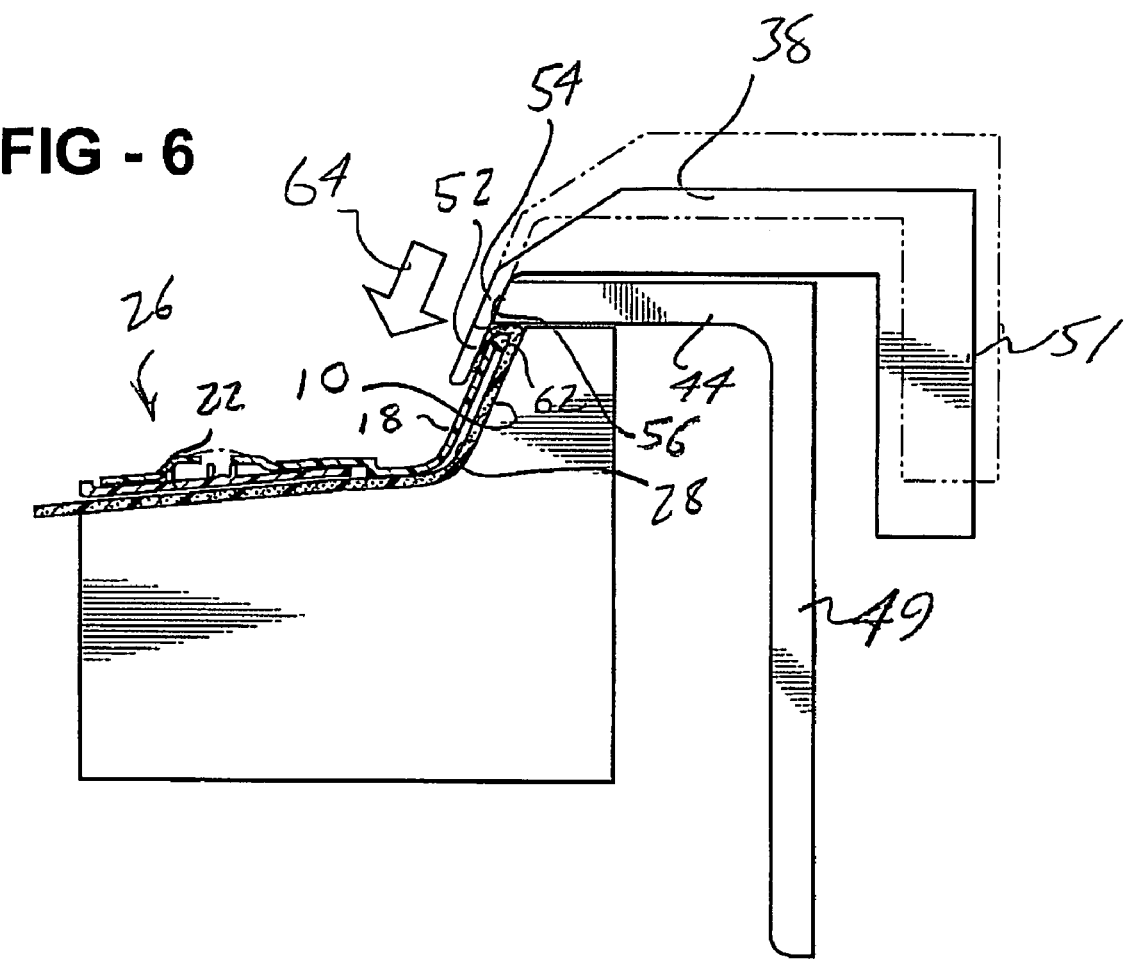

ASSEMBLY FOR PRODUCING AN AUTO HEADLINER WITH A FOLDED-OVER PERIMETER EDGE

FIELD OF THE INVENTION

The present invention relates generally to the formation of a vehicle headliner for use such as in sunroof applications. More specifically, the present invention discloses an assembly incorporating periphery extending and spaced apart sets of primary and secondary fingers associated with an edge fold headliner table, and which are cooperatively and successively manipulated to establish a non-pleated and folded over edge perimeter edge associated with tie headliner.

BACKGROUND OF THE INVENTION

The prior art is documented with vehicle trim applications, such as in particular for creating an inner perimeter extending opening associated with such as a vehicle headliner. This need is her given tie popularity of vehicle sun roofs.

U.S. Pat. No. 6,161,895, issued to Jaeckle, discloses a method forming a headliner around a sunroof opening. The headliner exhibits three layers, including an outermost foam based fabric decorative layer, an intermediate foam substrate layer, and a rigid underside headliner perform. The headliner decorative and foam substrate layers are manipulated, along with the rigid perform, into a pleated edge configuration.

SUMMARY OF THE INVENTION

The present invention discloses an assembly for creating a folded edge for a headliner including a flexible material defining an outer perimeter edge about which is secured a rigid template in a non-pleated fashion. The assembly includes a table defining an outer configured perimeter, upon which is supported the headliner template.

The table includes a plurality of individual pairs of primary and secondary fingers arranged at perimeter spaced locations in mounted fashion over the outer configured perimeter. The fingers are configured so as to be in contacting and displaceable fashion relative to the headliner inner perimeters and such that the fingers are cooperatively displaced in a first step to impart a bent edge to the headliner.

A projecting edge of the secondary finger is subsequently displaced in sliding fashion over a terminating edge of the first finger, such as in a combined downwardly and outwardly motion parallel with the desired edge to be imparted to the headliner. In this fashion, the bend edge formed by the cooperative displacement of the first and second fingers is completely folded over the template to form the edge profile to the headliner.

BRIEF DESCRIPTION OF THE DRAWINGS

Reference will now be made to the attached drawings, when read in combination with the following detailed description, wherein like reference numerals refer to lice parts throughout the several views, and in which:

FIG. 6 is a further succeeding illustration showing the second fingers individually and successively displaced in a downward/angular direction in order to impart a folded-over inner perimeter extending profile to the headliner in a non-pleated fashion.

DETAILED DESCRIPTION OF THE PREFERRED EMBODIMENTS

Figure 1:
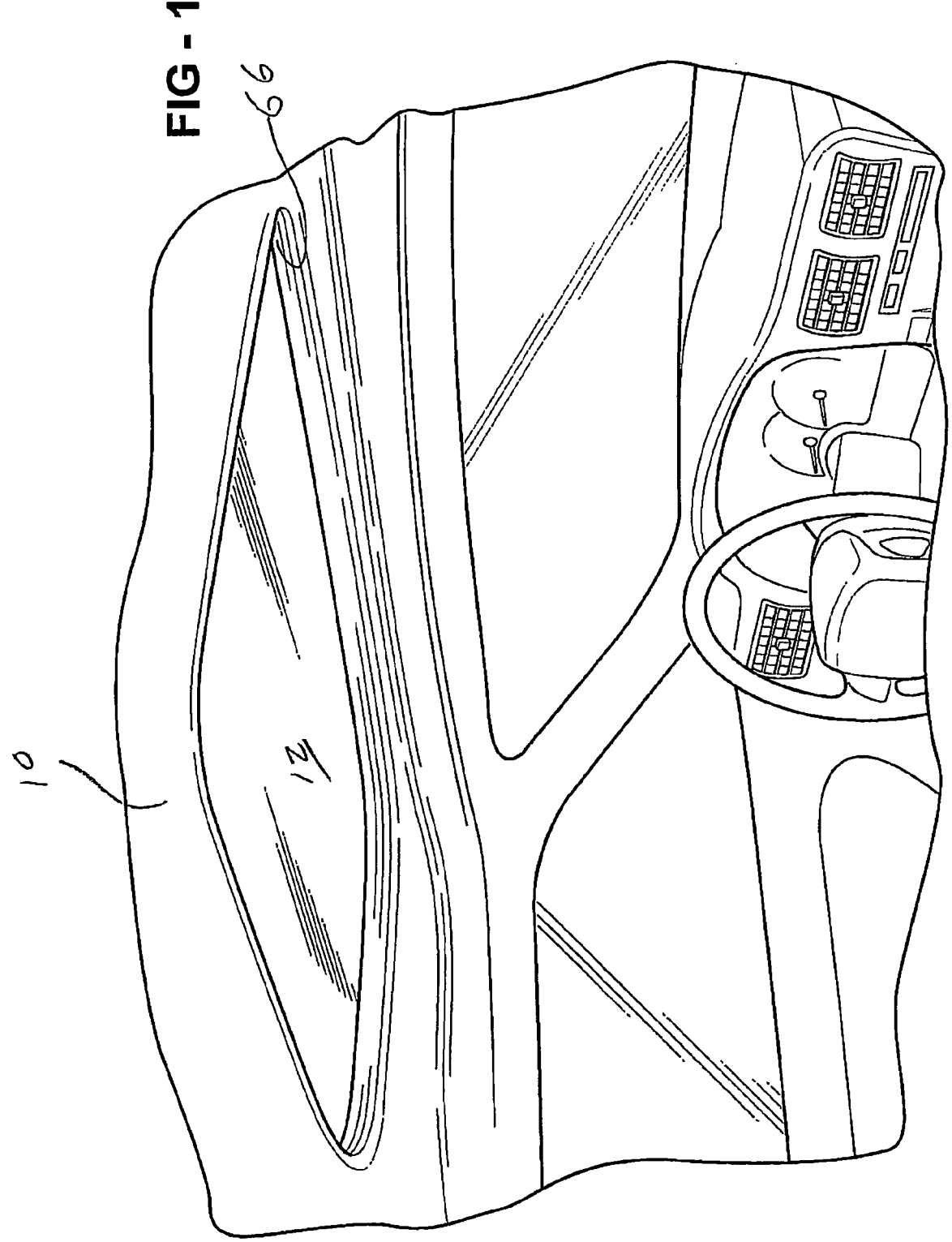
FIG. 1 is an environmental view illustrating a sunroof opening defined headliner installed in a vehicle roof.

Referring now to FIG. 1, a vehicle headliner is generally referenced at 10 according to the present invention. As previously disclosed, the present assembly creates a folded over edge for a vehicle headliner, such as is utilized in a sunroof application, at 12, in both a non pleated and non evident fashion.

Figure 2:
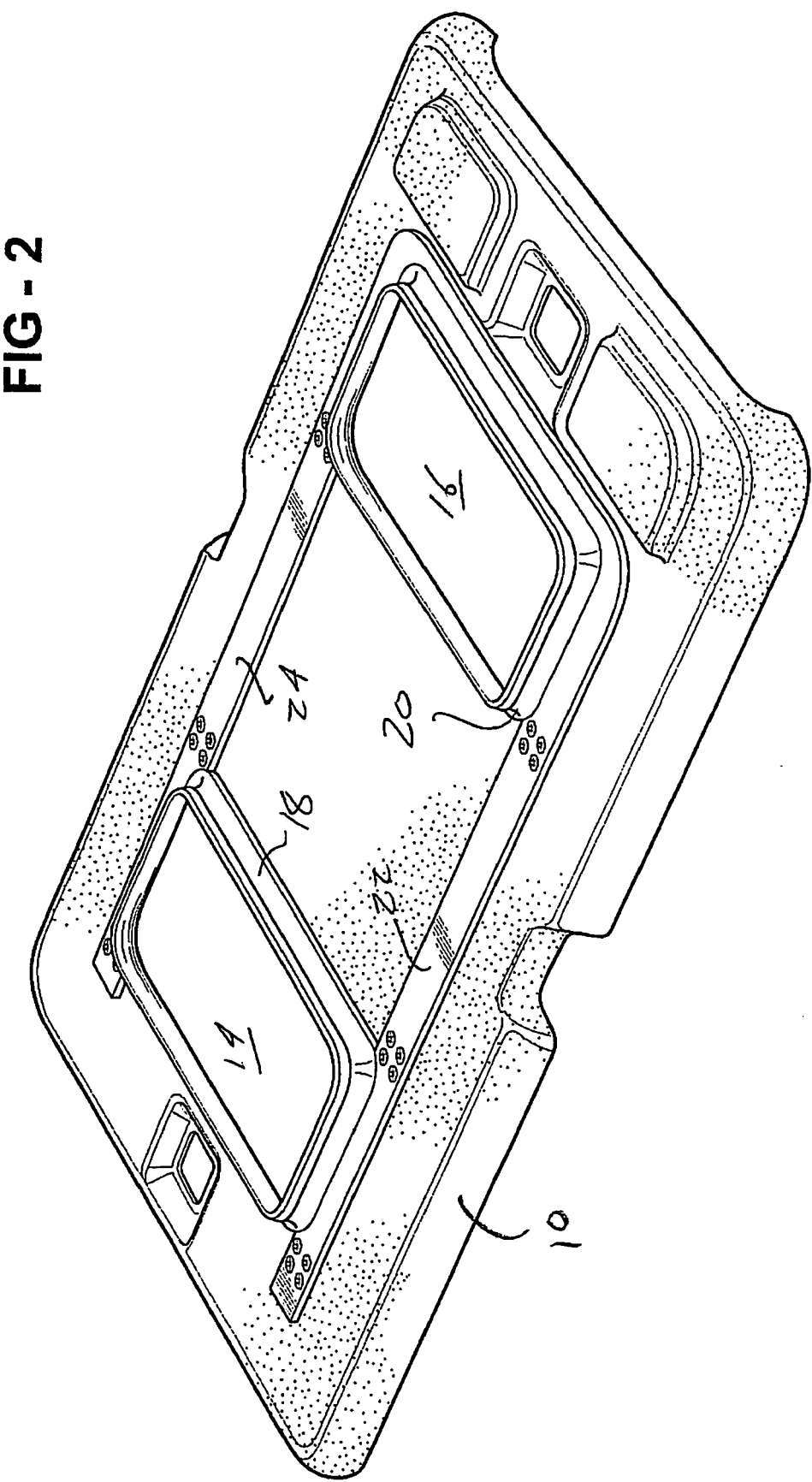
FIG. 2 is a view of an underside of a headliner and illustrating a support ring bonded about a headliner periphery, such as through the application of a hot-melt adhesive.

As is also shown in FIG. 2, a view of an underside of a headliner 10 is shown and includes a flexible material constructed of at least one layer of a fabric or a foam material. In one non-limiting and preferred application, the headliner 10 includes an outer decorative fabric layer, backed by a second foam layer.

The example of FIG. 2 illustrates a pair of inner perimeter defining edges defining open interiors, at 14 and 16, within the headliner 10. A support template, such as constructed from a rigid plastic or other suitable material, defines an enclosed rectangular shape such as with rounded corners and is bonded about a headliner periphery, further such as through the application of a hot-melt adhesive or other suitable chemical or mechanical fastening means The support template further includes an angled perimeter defining edge 18 and 20 corresponding in outline with the desired perimeter defined openings 14 and 16 of the dual sunroof application shown in FIG. 2, it being understood a single sunroof defining template is also envisioned. It is also envisioned that the folded over headliner can be provided without a support template and fastened directly to the vehicle headliner 10.

A plurality of interconnecting and outer perimeter defining flattened portions are formed, typically integrally, in contacting fashion with each one side of the angled perimeter defined edges 18 and 20. The flattened portions associated with the support template and further illustrated in FIG. 2 at 22 and 24 and extend in spaced apart and parallel fashion relative to one another and between which are defined the angled perimeter defined edges 18 and 20.

Figure 3:
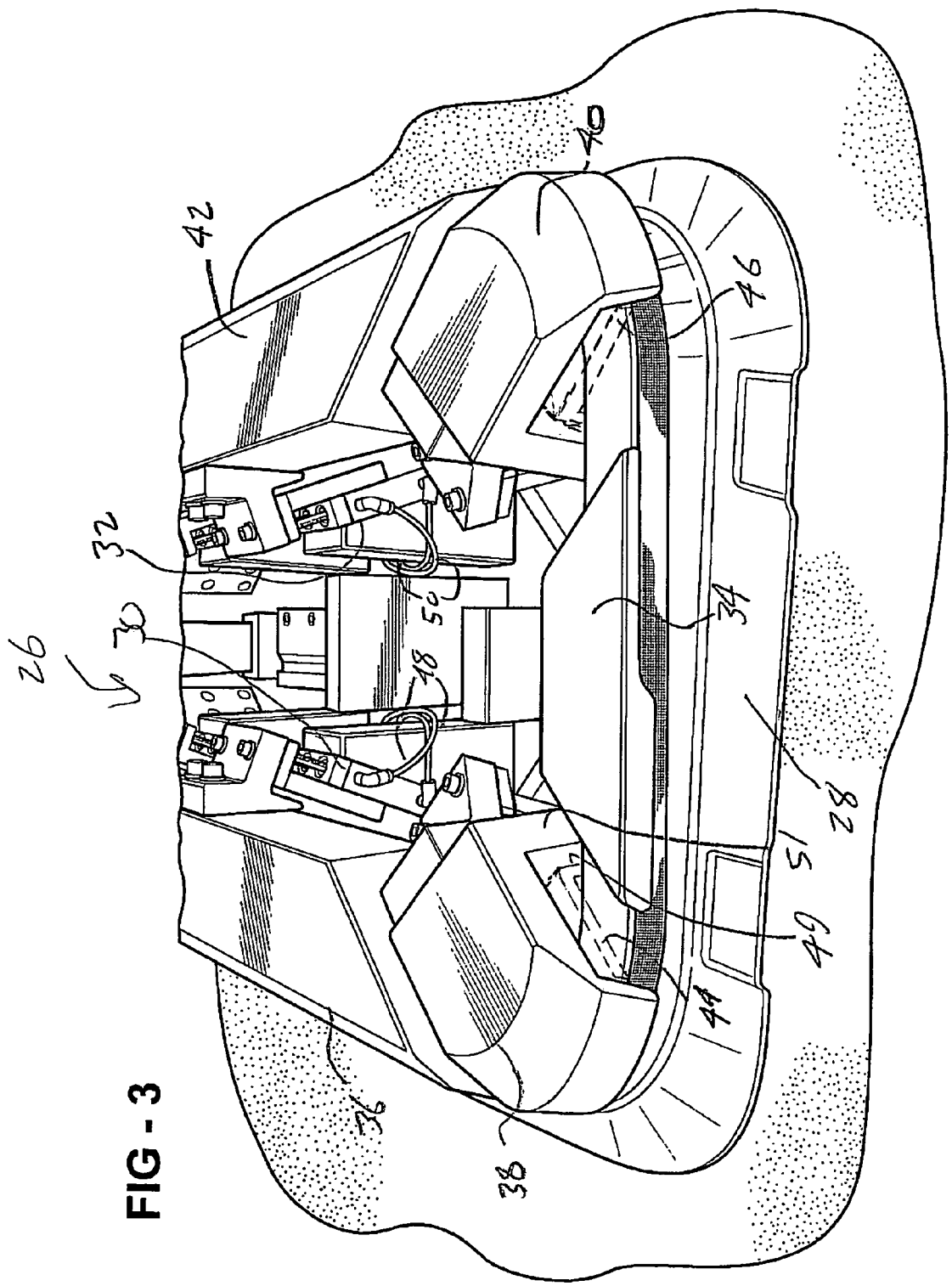
FIG. 3 is an illustration of periphery extending and spaced apart sets of primary and secondary fingers associated with an edge fold headliner table, and which are cooperatively and successively manipulated to establish a folded over edge perimeter edge associated with the headliner.

Referring now to FIG. 3 an illustration is shown of a perimeter defining support surface, such as being illustrated by a generally table shaped article as generally shown at 26, and which defines an outer configured perimeter 28. In a preferred application, the perimeter 28 establishes a generally rectangular and rounded edge profile corresponding to the inner profile of the vehicle sunroof 12 such as again shown in FIG. 1.

Although not shown in perspective, it is understood that the headliner material and attached perimeter defining template are supported in a generally framing manner upon the outer configured perimeter 28 and in surrounding fashion around an open interior of the table (again at 26). As further shown, the outer configured perimeter 28 is configured to include four linear extending sides interconnected along four rounded corners.

One or more mechanical, electrical and/or pneumatic (preferably air but also contemplating liquid/hydraulic) actuators, see for example as shown at 30 and 32 in FIG. 2, are provided at supported locations within the open interior of the table and in turn communicate with selected pairs of primary and secondary fingers, each of which are mounted in extending fashion over the outer configured perimeter 28. While more than one potential configuration of support fingers is contemplated, a preferred application as shown in FIG. 3 includes a primary fold finger 34 and a further plurality of secondary fold fingers 36, 38, 40 and 42.

Figure 4:
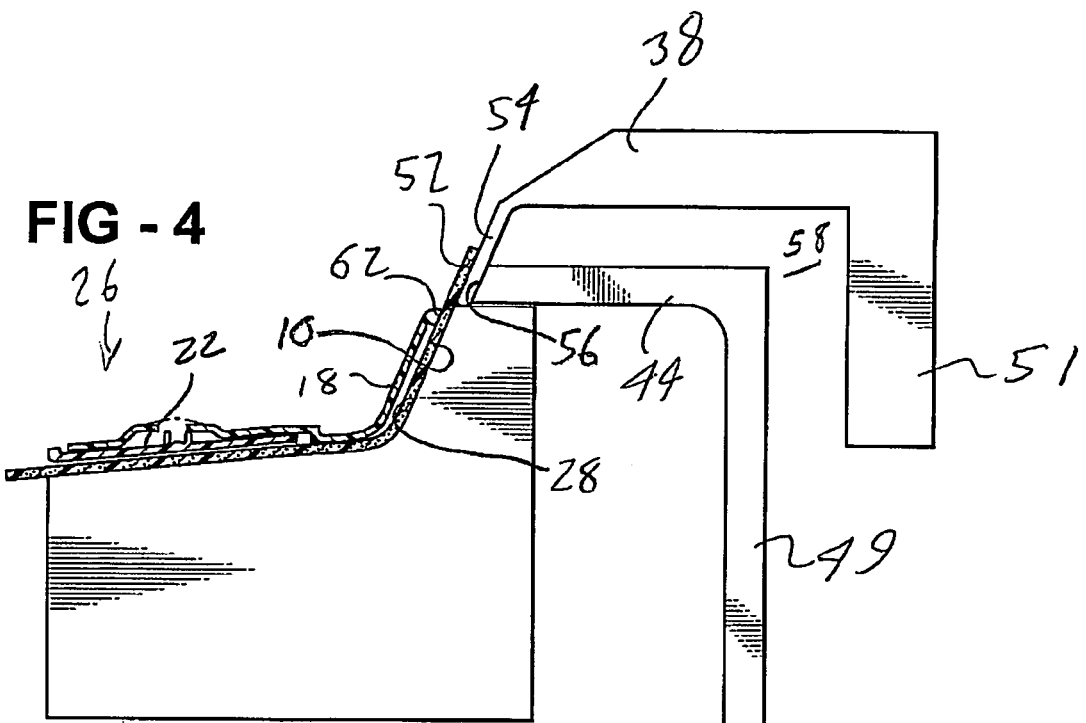
FIG. 4 is a two dimensional cutaway illustration taken at a selected periphery location in FIG. 3 and illustrating a set of primary and secondary fingers in a first position relative to a pre-positioned vehicle headliner supported upon the headliner table.
Figure 5:
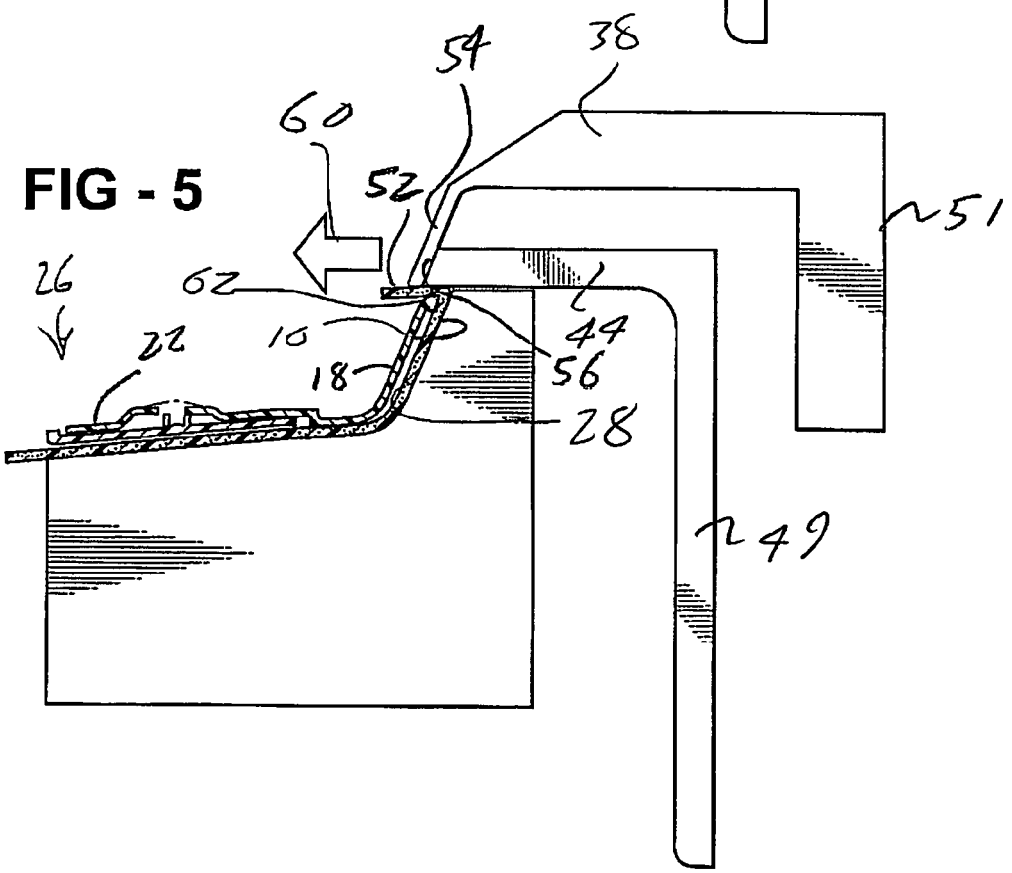
FIG. 5 is a succeeding illustration showing the first and second fingers cooperatively displacing outwardly in order to impart a first bend to the edge perimeter of the headliner.

As will be further explained in additional detail in the succeeding two dimensional illustrations of FIGS. 4-6, dedicated pairs of primary and secondary fold fingers are preferably arranged in pairs such that they overlap one another and are mounted to displace in outward fashion relative to the outer configured perimeter 28 (this illustration not being possible in the environmental elevation of FIG. 3). That said, it is also envisioned that the primary and secondary fold fingers can be rearranged in partially overlapping and perimeter offsetting fashion (not shown) about the outer configured perimeter 28.

It is also envisioned that a first sub-plurality of primary and secondary fingers can further include linear extending and mating edge profiles corresponding in placement with linear extending locations associated with the outer configured perimeter (see as shown by primary fold finger 34 (associated secondary fold finger not shown) and additional secondary fingers 36 and 42). A second plurality of the fingers can further alternate in arrangement and include arcuate extending and mating edge profiles corresponding in placement with rounded corners locations (see as further shown by secondary fingers 38 and 40 in FIG. 3, associated primary fold fingers being illustrated in phantom at 44 and 46). As also illustrated in FIG. 3, the pairs of support fingers can be placed in outward directed manner along the outer configured perimeter of the support table further such that the fingers exhibiting linear and arcuate exposed (headliner contacting) edges are arranged in alternating fashion and corresponding with a desired generally rectangular and rounded perimeter edge profile associated with the table perimeter 28.

As further shown in FIG. 3, the actuators 30 and 32 can be each connected to individual locations associated with pairs of the primary and secondary fold fingers, such as through the use of pairs of air/pneumatic or hydraulic/fluid conduits 48 and 50. As is also shown in each of the cutaway two dimensional views of FIGS. 4-6, each of the primary and second fingers further are constructed of a durable steel or like material, similar to that associated with the outer configured perimeter 28 of the table.

Each primary and secondary finger includes a first coplanar extending and initially spaced apart member overlaying the outer configured perimeter 28, with the secondary finger further including an integrally formed and downwardly angled end portion overlaying a corresponding angled edge profile associated with the first finger. Each of the primary and secondary fingers further includes a second member, typically integrally formed with its corresponding coplanar extending member and defining a generally "L" shaped profile.

In the interest of providing a repetitive description of each pair of fingers, the succeeding cutaway descriptions of FIGS. 4-6 illustrate, by example, overlapping locations associated with primary support finger 44 and secondary support finger 38, each of which further illustrate an angled "L" shaped profile with downwardly extending members, such as shown at 49 and 51, respectively. This configuration is also illustrated in FIG. 3, and renders a better understanding as to how the pairs of primary and secondary fingers are cooperatively and successively actuated by the fluid or air actuators 48 and 50 in the illustrated embodiment. It is further understood that each of the pairs of primary and secondary (fold) fingers exhibit a similar arrangement and configuration, regardless of whether they respectively include linear extending exposed edges (as with primary finger 34 and secondary fingers 36 and 42) or arcuate edges (as with primary fingers in phantom at 44 and 46 and respectively overlaying secondary fingers 38 and 40).

As illustrated in detail in each of the cutaway views of FIGS. 4-6, edge profiles associated with each of said pairs of fingers (referencing again designated pair 44 and 38) are arranged parallel to associated mounting locations with the table perimeter and are arranged in contacting and outwardly displaceable fashion relative to a projecting inner perimeter edge, see further at 52, of the flexible material associated with the headliner 10. Addressing first FIG. 4, the two dimensional cutaway illustration taken at the selected periphery location in FIG. 3 (again referencing primary fold finger 44 and secondary fold finger 38) illustrates the fingers in a first position relative to the pre-positioned vehicle headliner 10 supported upon the headliner table 26 and by which the inner perimeter defining edge 52 of the headliner projects upwardly past the rigid template angled perimeter defining edge 18.

Each of the second fingers, as again referenced by second finger 38, includes an integrally formed and downwardly angled end portion, see at 54, which overlays a corresponding angled edge profile, at 56, associated with the first finger 44. As further illustrated, the angled finger profiles, see again secondary finger 38 with interconnecting angled "L" shaped support 51 and primary finger 44 with likewise interconnecting angled "L" shaped support 49, establish a spaced distance 58 there between.

Referring further to FIG. 5, the succeeding illustration shows the first 49 and second 38 fingers cooperatively displacing outwardly, relative to the outer configured perimeter 28 associated with the table 26 and as referenced by arrow 60 in order to impart a first bend to the edge perimeter 52 of the headliner 10 and such that the bent edge 52 folds about the associated edge (at 62) of the rigid template angled perimeter defining edge 18. Referring finally to FIG. 6, the integrally formed and downwardly angled end portion 54 of second finger 38 (which again overlays corresponding angled edge profile 56 of primary finger 44) is individually and successively displaced in a downward/angular direction, see arrow 64 and such as in a parallel motion with respect to the headliner setting upon the angled template edge 18, in order to impart a folded-over inner perimeter extending profile associated with the edge 52 of the headliner being secured to a reverse facing surface of the rigid template's angled perimeter edge 18, such as in a non-stretch and non-pleated fashion. To this end, the construction of the flexible headliner, combined with its dimensioning, arrangement and degree of flex/bend, insure that the resultant edge trim profile (see FIG. 1 at 66) adjoining the vehicle sunroof 12 is such that no pleats, lines or bends are evident.

Having described my invention, other and additional preferred embodiments will become apparent to those skilled in the art to which it pertains, and without deviating from the scope of the appended claims.

I claim:

1. An assembly for creating a folded over edge for a headliner, comprising:

a flexible material defining an inner perimeter edge;

a surface defining an outer configured perimeter upon which is supported the flexible material;

a primary finger and a secondary finger mounted over said outer configured perimeter in contacting and outwardly displaceable fashion relative to said inner perimeter edge of said flexible material; and said fingers being cooperatively displaced in a first step in order to impart a first bend to the edge perimeter of the headliner, said secondary finger being subsequently displaced over a terminating edge of said primary finger in order to fold over the bent edge to form an inner perimeter extending profile to the headliner in a non-pleated fashion.

2. The assembly as described in claim 1, further comprising a rigid template supported upon said flexible material and said outer configured perimeter of said surface, said bent edge being folded over said template.

3. The assembly as described in claim 1, each of said primary and secondary fingers further comprising a coplanar extending and initially spaced apart member overlaying said outer configured perimeter, said secondary finger further comprising an integrally formed and downwardly angled end portion overlaying a corresponding angled edge profile associated with said first finger.

4. The assembly as described in claim 2, each of said fingers further comprising a second member integrally formed with said coplanar extending member and defining a generally "L" shaped profile.

5. The assembly as described in claim 1, said flexible material having a specified shape and size and further comprising at least one layer constructed of at least one of a fabric and a foam material.

6. The assembly as described in claim 5, said flexible material Her comprising a first fabric layer and a second foam layer.

7. The assembly as described in claim 2, said rigid template further comprising an angled perimeter defining edge seating upon said configured perimeter of said surface.

8. The assembly as described in claim 7, further comprising at least one flattened profile portion associated with said template and which is secured to additional locations associated with the flexible material.

9. The assembly as described in claim 8, said template further comprising a plurality of interconnecting flattened portions supporting said angled perimeter defining edge.

10. The assembly as described in claim 3, said surface further comprising a table exhibiting said outer configured perimeter with a generally rectangular and rounded edged profile corresponding to an inner profile of a vehicle sunroof.

11. The assembly as described in claim 10, further comprising a plurality of individual pairs of primary and secondary fingers arranged at spaced apart locations around said outer configured perimeter of said table.

12. The assembly as described in claim 11, said table further comprising an open interior bounded by said outer configured perimeter, at least one actuator mounted within said interior and communicating with said primary and secondary fingers.

13. The assembly as described in claim 12, further comprising a plurality of at least one actuator for controlled displacement of said pairs of first and second fingers.

14. The assembly as described in claim 13, a first sub-plurality of said fingers further comprising linear extending and mating edge profiles corresponding in placement with linear extending locations associated with said outer configured perimeter.

15. The assembly as described in claim 14, a second plurality of said fingers further alternating in arrangement with said first sub-plurality of fingers and further comprising arcuate extending and mating edge profiles corresponding in placement with rounded corner locations of said outer configured perimeter.

16. An assembly for creating a folded over edge for a vehicle headliner utilized in a sunroof application, said assembly comprising:

a flexible material constructed of at least one layer each of a fabric and a foam material and defining an inner perimeter edge about which is secured a rigid template, said template including an angled perimeter edge and an interconnecting and outer supporting flattened portion;

a table defining an outer configured perimeter having a generally rectangular and rounded edge profile corresponding to an inner profile of the vehicle sunroof and upon which is supported said inner perimeter edge fabric and said attached angled perimeter edge of said template, said table further comprising an open interior bounded by said outer configured perimeter with at least one actuator supported within said interior;

a plurality of pairs of primary and secondary fingers mounted in extending fashion over said outer configured perimeter, edge profiles associated with each of said pairs of fingers being parallel to associated mounting locations with said table perimeter and being arranged in contacting and outwardly displaceable fashion relative to said inner perimeter edge of said flexible material; and said fingers being cooperatively displaced outwardly in a first step in order to impart a first bend to the edge perimeter of the headliner, said secondary finger being subsequently displaced downwardly over a terminating edge of said primary finger in order to fold over the bent edge against said template and to form an inner perimeter extending profile to the headliner in a non-pleated fashion.

17. The assembly as described in claim 16, each of said first and second fingers further comprising a coplanar extending and initially spaced apart member overlaying said outer configured perimeter, said secondary finger further comprising an integrally formed and downwardly angled end portion overlaying a corresponding angled edge profile associated with said first finger.

18. The assembly as described in claim 17, each of said fingers further comprising a second member integrally formed with said coplanar extending member and defining a generally "L" shaped profile.

19. The assembly as described in claim 16, further comprising a plurality of actuators for controlled displacement of said pairs of first and second fingers.

20. An assembly for creating a folded over edge for a vehicle headliner utilized in a sunroof application, said assembly comprising:

a flexible material defining an inner perimeter edge about which is secured a rigid template;

a table defining an outer configured perimeter having a generally rectangular and rounded edge profile corresponding to an inner profile of the vehicle sunroof and upon which is supported said template angled perimeter edge;

pairs of primary and secondary fingers mounted in extending fashion over said outer configured perimeter, edge profiles associated with each of said pairs of fingers being parallel to associated mounting locations with said table perimeter and being arranged in contacting and outwardly displaceable fashion relative to said inner perimeter edge of said flexible material; and said fingers being cooperatively displaced outwardly in a first step in order to impart a first bend to the edge perimeter of the headliner, said secondary finger being subsequently displaced downwardly over a terminating edge of said primary finger in order to fold over the bent edge against said template and to form an inner perimeter extending profile to the headliner in a non-pleated fashion.

* * * * *

UNITED STATES PATENT AND TRADEMARK OFFICE
CERTIFICATE OF CORRECTION

| | | |
|---|---|---|
| PATENT NO. | : 7,874,832 B2 | Page 1 of 1 |
| APPLICATION NO. | : 12/138801 | |
| DATED | : January 25, 2011 | |
| INVENTOR(S) | : Ray Kujawa | |

It is certified that error appears in the above-identified patent and that said Letters Patent is hereby corrected as shown below:

Column 1, line 14 replace "tie" with --the--
Column 1, line 15 replace "llce" with --like--
Column 5, line 35 replace "Her" with --further--

Signed and Sealed this

Thirteenth Day of September, 2011

David J. Kappos
*Director of the United States Patent and Trademark Office*